B. R. Norton,
Pen.
No. 9809.  Patented June 21, 1853.
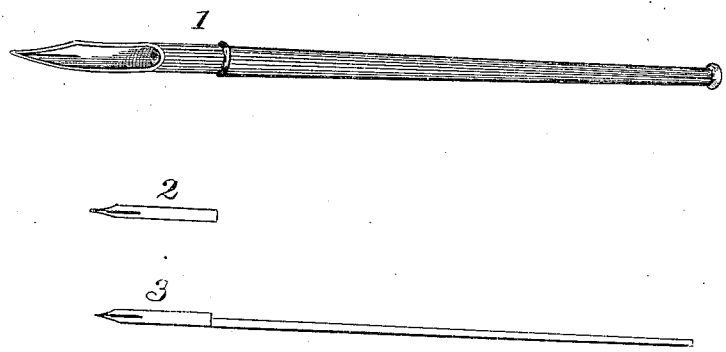

UNITED STATES PATENT OFFICE.

BENJ. R. NORTON, OF SYRACUSE, NEW YORK.

METALLIC-POINTED PEN.

Specification of Letters Patent No. 9,809, dated June 21, 1853.

*To all whom it may concern:*

Be it known that I, BENJAMIN R. NORTON, of the city of Syracuse, in the county of Onondaga and State of New York, have invented a new and useful Improvement in Metallic-Pointed Gutta-Percha Pens; and I do hereby declare the following to be a full, clear, and exact description of the same, reference being had to the annexed drawings, making part of this specification.

My invention is constructed as follows: Prepare metallic molds, in halves, or as most convenient, the inside or matrix of which is of the shape and size of the pen to be made, having on one end a cylinder and piston for forcing the gum or composition of gums when in a plastic state, into the molds. The points, Figure 2, are prepared by soldering iridium onto gold or its alloy, or any other suitable metal, then ground, split, and worked as in the ordinary process of making gold pens. Solder a wire, Fig. 3, to the upper end of the points so prepared, leaving the wire of sufficient length to form a handle for the pen; put the points and wire, (after being attached,) into the molds, heat the gum to a plastic state, and press it into the mold with great force by means of the piston, which will cause the gum to completely envelop the wire handle and ribs, except their extreme ends, which must be protected by the molds. After the gum has become sufficiently cold, the whole may be removed from the molds, and will be found to possess all the durability of the gold, together with the ease and flexibility of the quill, at much less expense than the ordinary gold pen.

My invention is not confined to the precise metals indicated, but consists in attaching a metallic pen, with iridium points, to a wire handle, and covering, (by the process described or any analogous process,) the pen and handle with gutta percha, or other elastic gum, to give elasticity to the whole.

What I claim as my invention, and desire to secure by Letters Patent is—

A metallic pointed pen attached to a wire of the length required to form a handle or holder, when such pen and holder are covered from the top of the holder to near the nib of the pen by a coating of gutta percha, or india rubber of suitable thickness, made in the manner and for the purposes set forth.

BENJAMIN R. NORTON.

Witnesses:
  R. F. STEVENS,
  D. HOTCHKISS.